(12) United States Patent
Miyazaki

(10) Patent No.: US 11,917,479 B2
(45) Date of Patent: *Feb. 27, 2024

(54) INFORMATION PROCESSING APPARATUS, COMMUNICATION TERMINAL, AND NON-TRANSITORY STORAGE MEDIUM STORING INSTRUCTIONS EXECUTABLE BY INFORMATION PROCESSING APPARATUS

(71) Applicant: BROTHER KOGYO KABUSHIKI KAISHA, Nagoya (JP)

(72) Inventor: Sadaaki Miyazaki, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 65 days.

This patent is subject to a terminal disclaimer.

(21) Appl. No.: 17/695,930

(22) Filed: Mar. 16, 2022

(65) Prior Publication Data

US 2022/0210714 A1    Jun. 30, 2022

Related U.S. Application Data

(63) Continuation of application No. 16/850,170, filed on Apr. 16, 2020, now Pat. No. 11,405,837, which is a
(Continued)

(30) Foreign Application Priority Data

Mar. 27, 2013 (JP) ................. 2013-066239

(51) Int. Cl.
*H04W 36/14* (2009.01)
*G06F 3/12* (2006.01)
(Continued)

(52) U.S. Cl.
CPC .......... *H04W 36/14* (2013.01); *G06F 3/1204* (2013.01); *G06F 3/1236* (2013.01);
(Continued)

(58) Field of Classification Search
CPC ......... H04L 29/06; H04L 69/14; H04L 69/24; H04W 4/80; H04W 36/14; H04W 76/14
See application file for complete search history.

(56) References Cited

U.S. PATENT DOCUMENTS 7,706,789 B2    4/2010 Qi et al.
8,527,006 B2    9/2013 Tat et al.
(Continued)

FOREIGN PATENT DOCUMENTS

JP    2005-210328 A    8/2005
JP    2007-166538 A    6/2007
(Continued)

OTHER PUBLICATIONS

Notice of Allowance dated Mar. 16, 2015 from related U.S. Appl. No. 14/203,985, filed Mar. 11, 2014.
(Continued)

*Primary Examiner* — Melanie Jagannathan
(74) *Attorney, Agent, or Firm* — Scully, Scott, Murphy & Presser, PC

(57) ABSTRACT

An information processing apparatus and a communication terminal can carry out first wireless communication and second wireless communication. The first wireless communication is established when a distance between the information processing apparatus and the communication terminal is equal to or less than a first distance. The information processing apparatus determines whether data communication is to be carried out over the first wireless communication or the second wireless communication. When the data communication is to be carried out over the first wireless
(Continued)

communication, the information processing apparatus carries out the data communication over the first wireless communication. When the data communication is to be carried out over the second wireless communication, the information processing apparatus carries out data communication of first setting information with the communication terminal over the first wireless communication to establish the second wireless communication and carries out data communication over the second wireless communication.

20 Claims, 6 Drawing Sheets

Related U.S. Application Data continuation of application No. 15/687,783, filed on Aug. 28, 2017, now Pat. No. 10,631,216, which is a continuation of application No. 14/797,903, filed on Jul. 13, 2015, now Pat. No. 9,749,920, which is a continuation of application No. 14/203,985, filed on Mar. 11, 2014, now Pat. No. 9,086,830.

(51) Int. Cl.
| | | |
|---|---|---|
| H04W 84/12 | (2009.01) | |
| H04W 76/14 | (2018.01) | |
| H04W 4/80 | (2018.01) | |
| H04L 69/14 | (2022.01) | |
| H04N 1/00 | (2006.01) | |

(52) U.S. Cl.
CPC ............ *G06F 3/1292* (2013.01); *H04L 69/14* (2013.01); *H04N 1/00217* (2013.01); *H04W 4/80* (2018.02); *H04W 76/14* (2018.02); *H04W 84/12* (2013.01); *H04N 1/00307* (2013.01); *H04N 2201/006* (2013.01); *H04N 2201/0036* (2013.01); *H04N 2201/0055* (2013.01); *H04N 2201/0094* (2013.01)

(56) References Cited

U.S. PATENT DOCUMENTS

| | | |
|---|---|---|
| 2007/0190939 A1 | 8/2007 | Abel |
| 2008/0081631 A1 | 4/2008 | Rofougaran |
| 2010/0011128 A1 | 1/2010 | Paycher et al. |
| 2010/0068997 A1 | 3/2010 | Dunko |
| 2010/0246824 A1 | 9/2010 | Xiao et al. |
| 2011/0080486 A1 | 4/2011 | Yamaguchi |
| 2011/0151788 A1 | 6/2011 | Castrogiovanni et al. |
| 2011/0182221 A1 | 7/2011 | Arakawa |
| 2012/0317194 A1 | 12/2012 | Tian |
| 2013/0210344 A1 | 8/2013 | Horikawa et al. |
| 2014/0009791 A1 | 1/2014 | Asakura |
| 2014/0118769 A1 | 5/2014 | Adachi et al. |
| 2014/0179234 A1 | 6/2014 | Lee et al. |
| 2014/0185086 A1 | 7/2014 | Fallon et al. |
| 2014/0219262 A1* | 8/2014 | Sun ........................... H04L 9/08 370/338 |
| 2014/0233058 A1 | 8/2014 | Aritomi |
| 2014/0273858 A1 | 9/2014 | Panther et al. |
| 2014/0369212 A1 | 12/2014 | Ravari et al. |
| 2015/0126115 A1 | 5/2015 | Yun et al. |
| 2015/0160897 A1 | 6/2015 | Mori |
| 2015/0223281 A1 | 8/2015 | Hamada |
| 2015/0334284 A1* | 11/2015 | Fukushima ........... H04W 52/02 340/12.5 |
| 2016/0182130 A1* | 6/2016 | Ahmed ................ H04B 5/0031 455/41.1 |
| 2016/0261975 A1 | 9/2016 | Kurihara |
| 2016/0366542 A1 | 12/2016 | Brown et al. |
| 2018/0022359 A1 | 1/2018 | Gusenbauer et al. |
| 2018/0124847 A1 | 5/2018 | Nishida |
| 2021/0318888 A1 | 10/2021 | Abbasian et al. |

FOREIGN PATENT DOCUMENTS

| | | |
|---|---|---|
| JP | 2007-251736 A | 9/2007 |
| JP | 2010-146991 A | 7/2010 |
| JP | 2010-178002 A | 8/2010 |
| JP | 2011-076535 A | 4/2011 |

OTHER PUBLICATIONS

Notice of Allowance dated Apr. 25, 2017 from related U.S. Appl. No. 14/797,903, filed Jul. 13, 2015.
Notification of Reason for Refusal dated Dec. 27, 2016 received from the Japanese Patent Office in related application JP 2013-066239 together with English language translation.
United States Office Action dated Jan. 11, 2017 from related U.S. Appl. No. 14/797,903, filed Jul. 13, 2015.
United States Office Action dated Jan. 2, 2019 from related U.S. Appl. No. 15/687,783, filed Aug. 28, 2017.
United States Office Action dated Jun. 20, 2019 from related U.S. Appl. No. 15/687,783, filed Aug. 28, 2017.
United States Notice of Allowance dated Dec. 18, 2019 from related U.S. Appl. No. 15/687,783, filed Aug. 28, 2017.
United States Office Action dated Apr. 27, 2021 from related U.S. Appl. No. 16/850,170, filed Apr. 16, 2020.
United States Office Action dated Sep. 9, 2021 from related U.S. Appl. No. 16/850,170, filed Apr. 16, 2020.
United States Notice of Allowance dated Mar. 9, 2022 from related U.S. Appl. No. 16/850,170, filed Apr. 16, 2020.

* cited by examiner

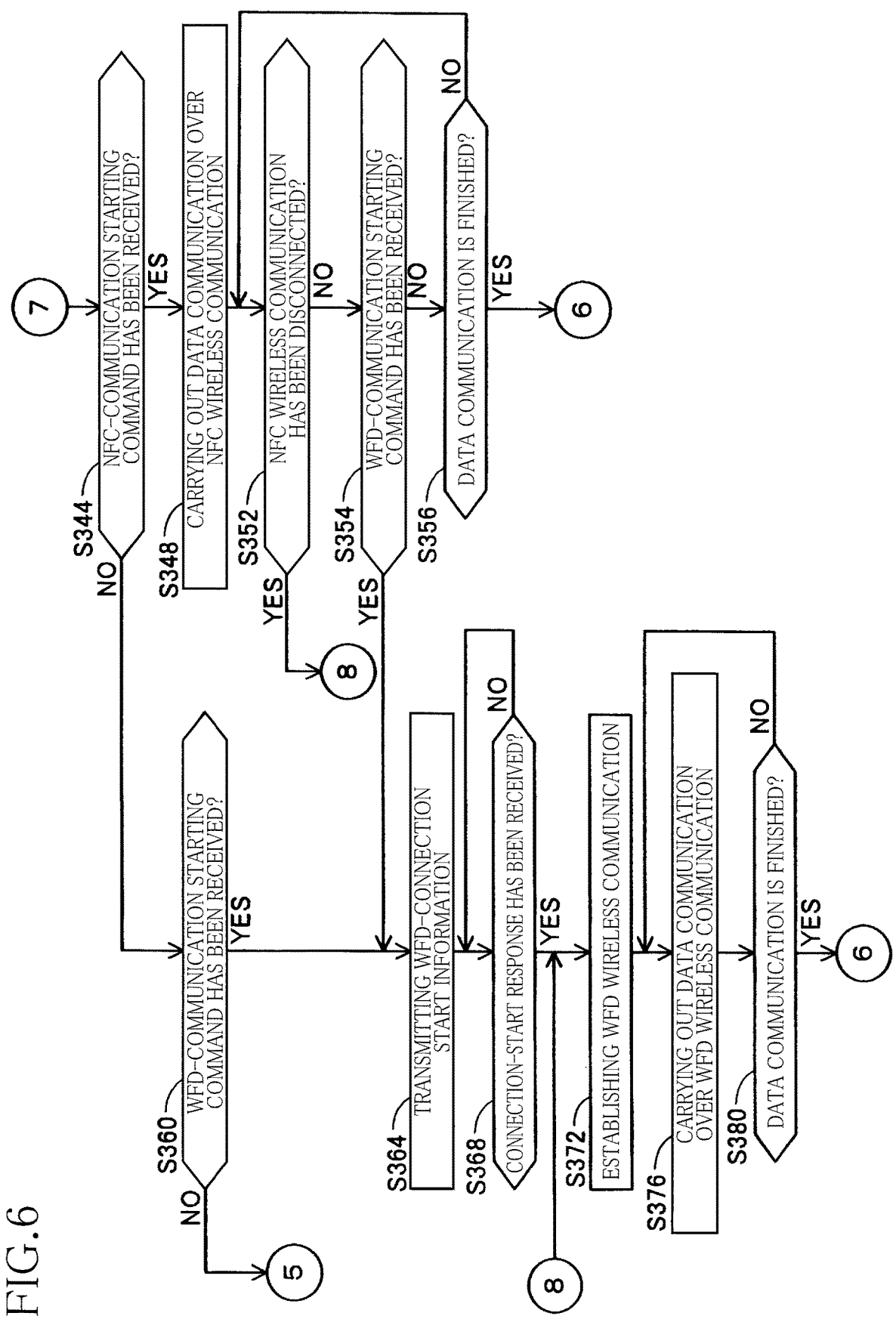

INFORMATION PROCESSING APPARATUS, COMMUNICATION TERMINAL, AND NON-TRANSITORY STORAGE MEDIUM STORING INSTRUCTIONS EXECUTABLE BY INFORMATION PROCESSING APPARATUS

CROSS REFERENCE TO RELATED APPLICATION

The present application is a continuation application of U.S. patent application Ser. No. 16/850,170 filed on Apr. 16, 2020, which is a continuation application of U.S. patent application Ser. No. 15/687,783 filed on Aug. 28, 2017, now U.S. Pat. No. 10,631,216 issued on Apr. 21, 2020, which is a continuation application of U.S. patent application Ser. No. 14/797,903 filed on Jul. 13, 2015, now U.S. Pat. No. 9,749,920, issued on Aug. 29, 2017, which is a continuation of U.S. patent application Ser. No. 14/203,985 filed on Mar. 11, 2014, now U.S. Pat. No. 9,086,830, issued on Jul. 21, 2015 and claims priority from Japanese Patent Application No. 2013-066239, which was filed on Mar. 27, 2013, the disclosures of each of which are herein incorporated by reference in their entirety.

BACKGROUND OF THE INVENTION

Field of the Invention

The present invention relates to an information processing apparatus communicable with a communication terminal, the communication terminal, and a non-transitory storage medium storing a plurality of instructions executable by a processor of the information processing apparatus.

Description of the Related Art

There is known a technique for carrying out wireless communication between two communication devices. For example, the two communication devices use short-distance wireless communication (i.e., wireless communication according to NFC (Near Field Communication) standard) to carry out communication for wireless settings. These wireless settings are used for carrying out wireless communication according to a communication standard (e.g., IEEE 802.11a, 802.11b) that differs from the NFC standard. Accordingly, the two communication devices can carry out wireless communication according to the wireless settings.

SUMMARY OF THE INVENTION

To switch a communication path from the short-distance wireless communication to the wireless communication according to the wireless settings, there is a need to execute various kinds of processings. Also, the switch of the communication path may cause a switching time in which no communication can be carried out. Considering a load of processing and a time required for communication, there are two cases in which data should be transferred over the short-distance wireless communication without any switch of the communication path and in which data should be transferred over the wireless communication after the switch of the communication path.

The present invention provides an information processing apparatus including: a first communication interface configured to carry out first wireless communication with a communication terminal according to a first communication standard; a second communication interface configured to carry out second wireless communication with the communication terminal according to a second communication standard; a processor; and a memory configured to store a plurality of instructions. The plurality of instructions, when executed by the processor, cause the information processing apparatus to execute: a first communication processing in which the first communication interface establishes the first wireless communication when a distance between the communication terminal and the first communication interface is equal to or less than a first distance; a first-information obtaining processing in which the information processing apparatus obtains first information; a determination processing in which the information processing apparatus determines, based on the first information obtained in the first-information obtaining processing, whether data communication is to be carried out with the communication terminal over one of the first wireless communication and the second wireless communication; a second communication processing in which when the information processing apparatus determines, in the determination processing, that the data communication is to be carried out with the communication terminal over the first wireless communication, the information processing apparatus carries out the data communication with the communication terminal over the first wireless communication established in the first communication processing; and a third communication processing in which when the information processing apparatus determines, in the determination processing, that the data communication is to be carried out with the communication terminal over the second wireless communication, the information processing apparatus carries out data communication of first setting information with the communication terminal over the first wireless communication established in the first communication processing to establish the second wireless communication with the communication terminal and carries out data communication with the communication terminal over the second wireless communication.

The present invention also provides a communication terminal including: a first communication interface configured to carry out first wireless communication with an information processing apparatus according to a first communication standard; a second communication interface configured to carry out second wireless communication with the information processing apparatus according to a second communication standard; a processor; and a memory configured to store a plurality of instructions. The plurality of instructions, when executed by the processor, cause the communication terminal to execute: a first communication processing in which the first communication interface establishes the first wireless communication when a distance between the communication terminal and the first communication interface is equal to or less than a first distance; a first-command-information obtaining processing in which the communication terminal uses the first communication interface to obtain, from the information processing apparatus, first command information for commanding data communication with the information processing apparatus over the first wireless communication; a second communication processing in which when the first command information is obtained in the first-command-information obtaining processing, the communication terminal carries out the data communication with the information processing apparatus over the first wireless communication established in the first communication processing; a second-command-information obtaining processing in which the communication terminal uses the first communication interface to obtain, from the information processing apparatus, second command information for commanding data communication with the information processing apparatus over the second wireless communication; and a third communication processing in which when the second command information is obtained in the second-command-information obtaining processing, the communication terminal establishes the second wireless communication with the communication terminal by using first setting information transferred with the information processing apparatus over the first wireless communication and carries out the data communication with the information processing apparatus over the second wireless communication.

The present invention also provides a non-transitory storage medium storing a plurality of instructions executable by a processor of an information processing apparatus. The information processing apparatus includes: a first communication interface configured to carry out first wireless communication with a communication terminal according to a first communication standard; a second communication interface configured to carry out second wireless communication with the communication terminal according to a second communication standard; and the processor. The plurality of instructions, when executed by the processor, cause the information processing apparatus to execute: a first communication processing in which the first communication interface establishes the first wireless communication when a distance between the communication terminal and the first communication interface is equal to or less than a first distance; a first-information obtaining processing in which the information processing apparatus obtains first information; a determination processing in which the information processing apparatus determines, based on the first information obtained in the first-information obtaining processing, whether data communication is to be carried out with the communication terminal over one of the first wireless communication and the second wireless communication; a second communication processing in which when the information processing apparatus determines, in the determination processing, that the data communication is to be carried out with the communication terminal over the first wireless communication, the information processing apparatus carries out the data communication with the communication terminal over the first wireless communication established in the first communication processing; and a third communication processing in which when the information processing apparatus determines, in the determination processing, that the data communication is to be carried out with the communication terminal over the second wireless communication, the information processing apparatus carries out data communication of first setting information with the communication terminal over the first wireless communication established in the first communication processing to establish the second wireless communication with the communication terminal and carries out data communication with the communication terminal over the second wireless communication.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIG. 6 is a flow chart illustrating operations of the communication terminal.

DETAILED DESCRIPTION OF THE EMBODIMENT

<Structure of Network 10>

Figure 1:
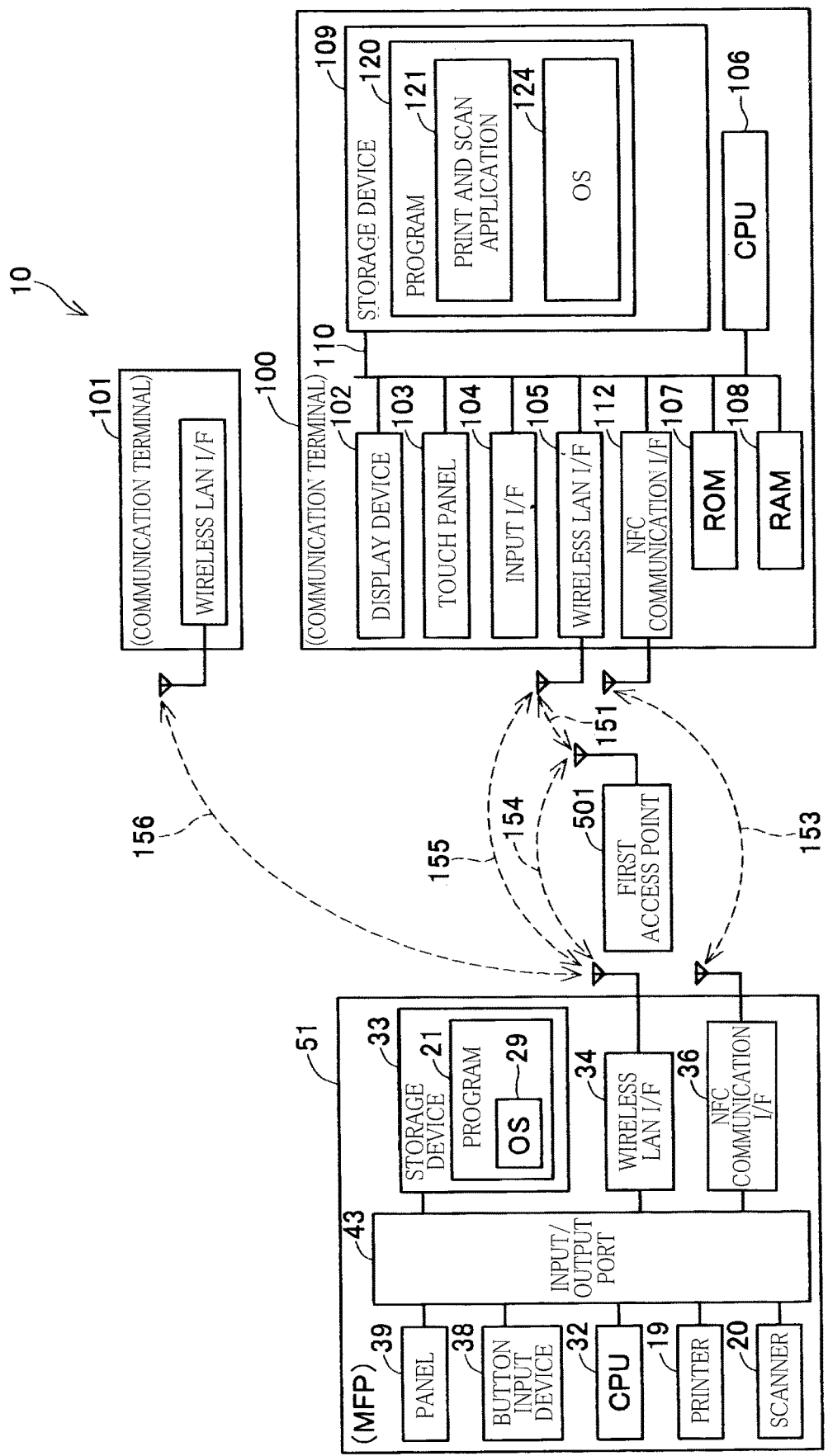
FIG. 1 is a block diagram illustrating a structure of a network.

FIG. 1 illustrates a structure of a network 10. The network 10 includes communication terminals (communication terminal devices or communication devices) 100, 101, an MFP 51, and a first access point 501. Here, the MFP is a multi-function peripheral having functions such as a printing function, a scanning function, and a copying function.

The communication terminal 100 includes an NFC communication interface 112 which can communicate with an NFC communication interface 36 of the MFP 51 over wireless communication 153 according to the NFC (Near Field Communication) standard (hereinafter may be referred to as "NFC wireless communication" or "NFC communication"). In the present embodiment, the NFC wireless communication is carried out according to ISO/IEC 21481 or 18092.

The communication terminal 100 includes a wireless LAN interface 105 which can communicate with a wireless LAN interface 34 of the MFP 51 in an infrastructure mode over wireless communication 151, 154 according to the wireless LAN standard (hereinafter may be referred to as "wireless LAN communication"). The wireless LAN interface 105 can also communicate directly with the wireless LAN interface 34 of the MFP 51 over wireless communication 155 according to the WiFi Direct (WFD) standard (hereinafter may be referred to as "WFD wireless communication" or "WFD communication"). The communication terminal 100 can establish a connection with the MFP 51 according to the WFD standard to establish a WFD network. The WFD wireless communication is carried out according to IEEE (the Institute of Electrical and Electronics Engineers) 802.11 and standards equivalent to it (e.g., 802.11a, 11b, 11g, and 11n). That is, the communication terminal 100 can transmit a print request and a scan request to the MFP 51 over the NFC wireless communication 153 or the WFD wireless communication 155 by executing a print and scan application 121.

<Structure of Communication Terminal 100>

The communication terminal 100 is a mobile device such as a mobile phone and a mobile terminal device. The communication terminal 100 includes a display device 102, a touch panel 103, an input interface 104, the wireless LAN interface 105, the NFC communication interface 112, a central processing unit (CPU) 106, a read only memory (ROM) 107, a random access memory (RAM) 108, and a storage device 109. These devices are connected to each other via an input/output port 110.

The display device 102 receives an image signal from the CPU 106 and displays an image based on the received image signal. Examples of the display device 102 include a liquid crystal display (LCD) and an organic electroluminescent panel. The touch panel 103 is formed of a transparent material and superposed on an upper surface of the display device 102. When touched with an input object such as a finger of a user or a stylus, the touch panel 103 detects a position of the touch and transmits information about the detected position to the CPU 106. The input interface 104 is constituted by operation buttons, for example.

The NFC communication interface 112 is an interface for carrying out the NFC wireless communication 153. Various kinds of information about communication settings such as an IP address and an SSID (Service Set Identifier) is unnecessary for establishing the NFC wireless communication 153. The wireless LAN interface 105 is an interface for carrying out the wireless LAN communication 151, 155. A communicable distance or range within which the wireless LAN communication 151, 155 can be carried out is greater than a communicable distance or range within which the NFC wireless communication 153 can be carried out. Also, a communication speed or rate in the wireless LAN communication 151, 155 is faster than that in the NFC wireless communication 153.

The CPU 106 executes programs stored in the storage device 109. The RAM 108 temporarily stores information required for processings to be executed by the CPU 106. The storage device 109 is constituted by a flash memory, a hard disc (HDD), a buffer in the CPU 106, and other similar devices in combination. The storage device 109 can store image data and document data, for example. The storage device 109 stores a program 120. The program 120 includes the application 121 and an operating system (OS) 124. The CPU 106 executes processings according to the program 120. In the following explanation, the CPU 106 which executes a program such as the application 121 and the OS 124 may be described simply by the name of program. For example, wordings "the application 121 executes" may mean wordings "the CPU 106 executing the application 121 executes".

The application 121 causes the CPU 106 to execute, e.g., a processing for transmitting a print command from the communication terminal 100 to the MFP 51, for example. The OS 124 is a program which provides basic functions and common services for the application 121 and other programs and devices. The OS 124 includes a program for causing the wireless LAN interface 105 and the NFC communication interface 112 to carry out wireless communication. The OS 124 also provides an application programming interface (API) for causing each program to obtain information obtained by hardware or for causing each program to output a command to hardware.

While the communication terminal 101 is similar in construction to the communication terminal 100, most components of the communication terminal 101 are not illustrated in FIG. 1 for simplicity. The communication terminal 101 can carry out WFD wireless communication 156 with the MFP 51.

<Structure of MFP 51>

There will be next explained a structure of the MFP 51. The MFP 51 mainly includes a CPU 32, a storage device 33, the wireless LAN interface 34, the NFC communication interface 36, a button input device 38, a panel 39, a printer 19, and a scanner 20. These devices are communicable with each other via an input/output port 43.

The CPU 32 executes a program 21 stored in the storage device 33. The storage device 33 is constituted by a RAM, a ROM, a flash memory, a hard disc (HDD), a buffer in a CPU 72, and other similar devices in combination. The storage device 33 stores the program 21. The program 21 includes an OS 29.

The NFC communication interface 36 is an interface for carrying out the NFC wireless communication 153. The wireless LAN interface 34 is an interface for carrying out the wireless LAN communication 154, 155. The button input device 38 includes keys for various functions of the MFP 51. The button input device 38 may be formed integrally with the panel 39 as a touch panel. The panel 39 displays various kinds of information about the functions of the MFP 51. The printer 19 prints an image based on image data stored in the storage device 33. The scanner 20 reads an image on a document.

<Operations of MFP 51>

Figure 2:
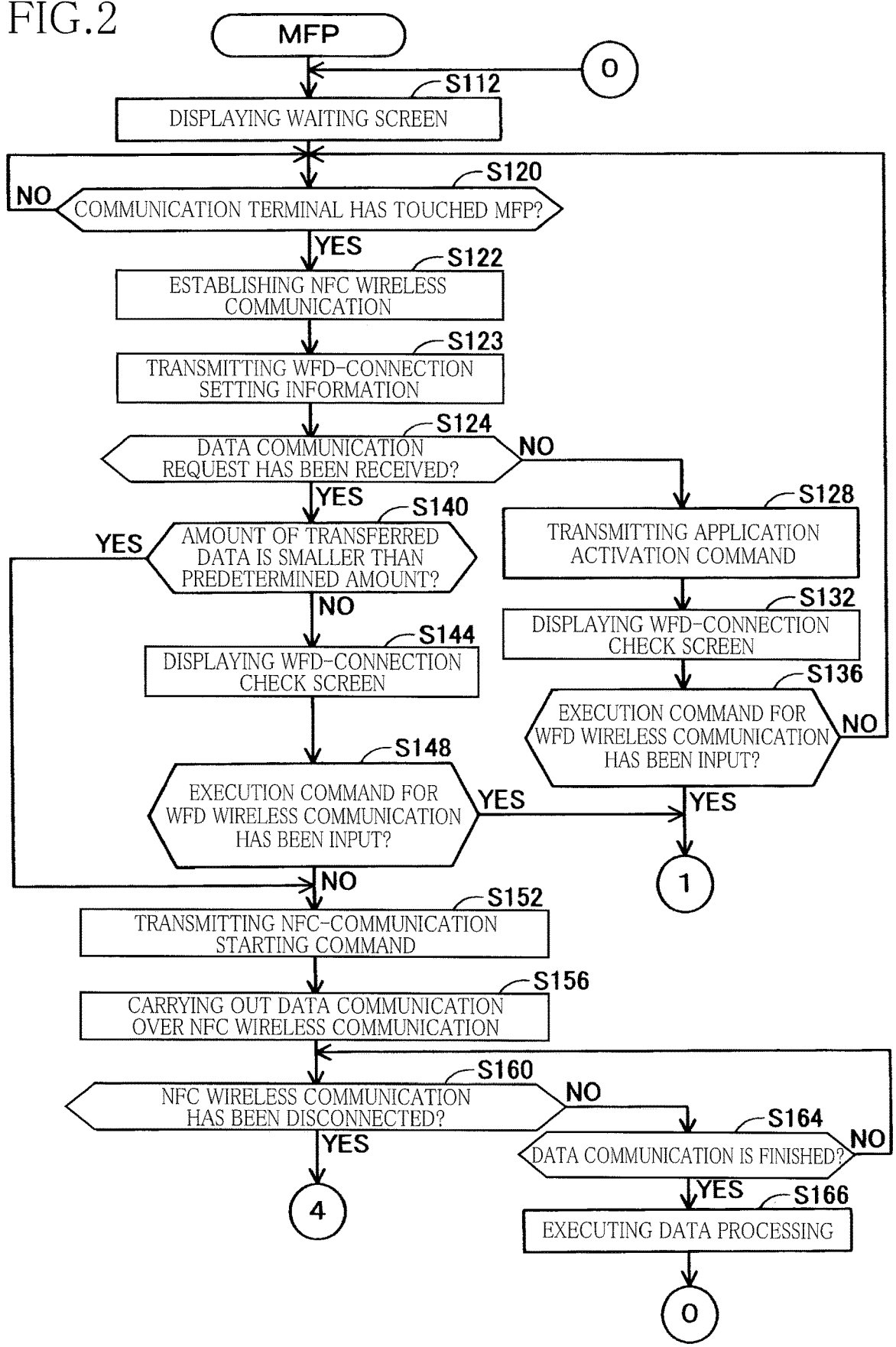
FIG. 2 is a flow chart illustrating operations of a multi-function peripheral (MFP)
Figure 3:
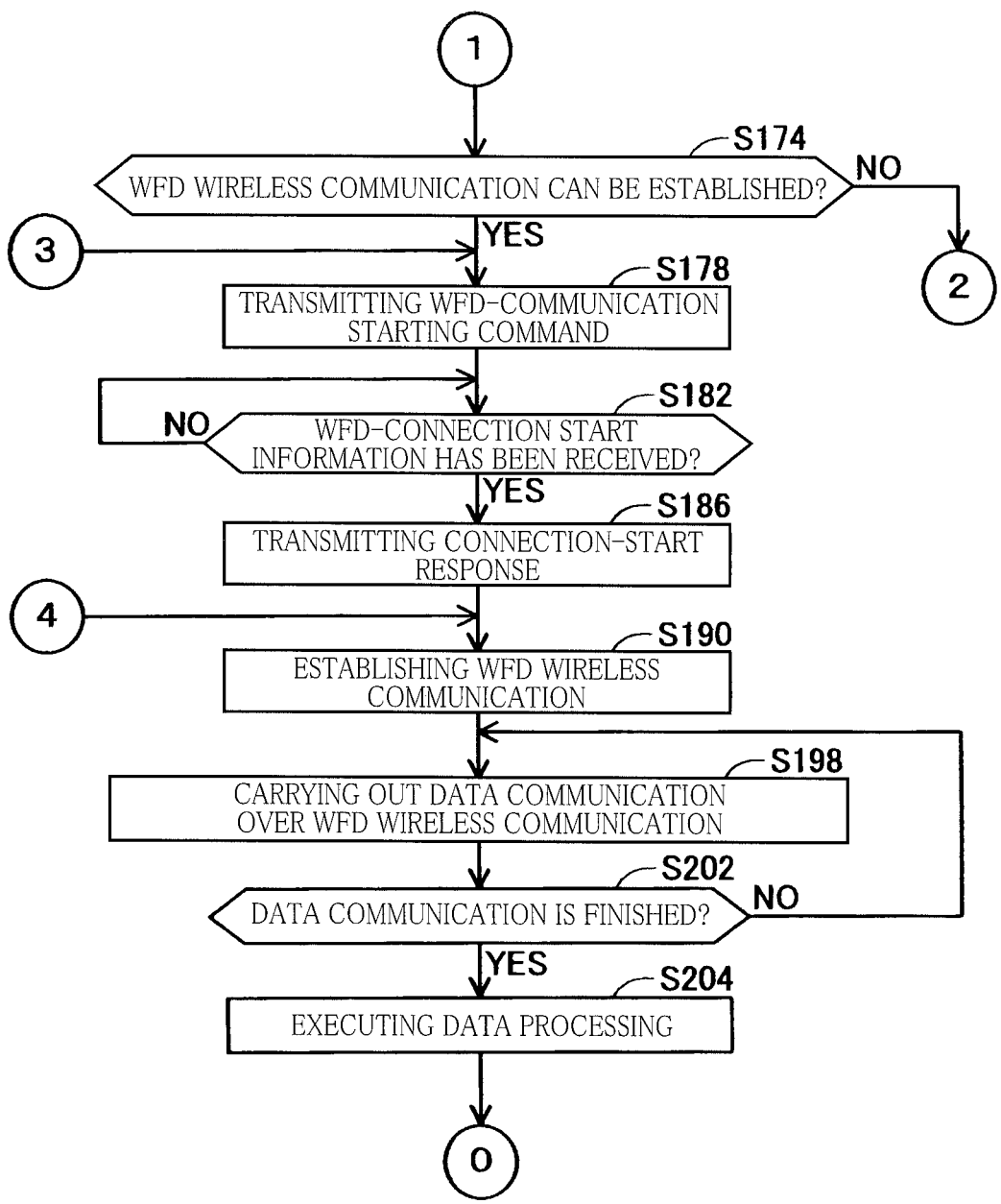
FIG. 3 is a flow chart illustrating operations of the MFP.
Figure 4:
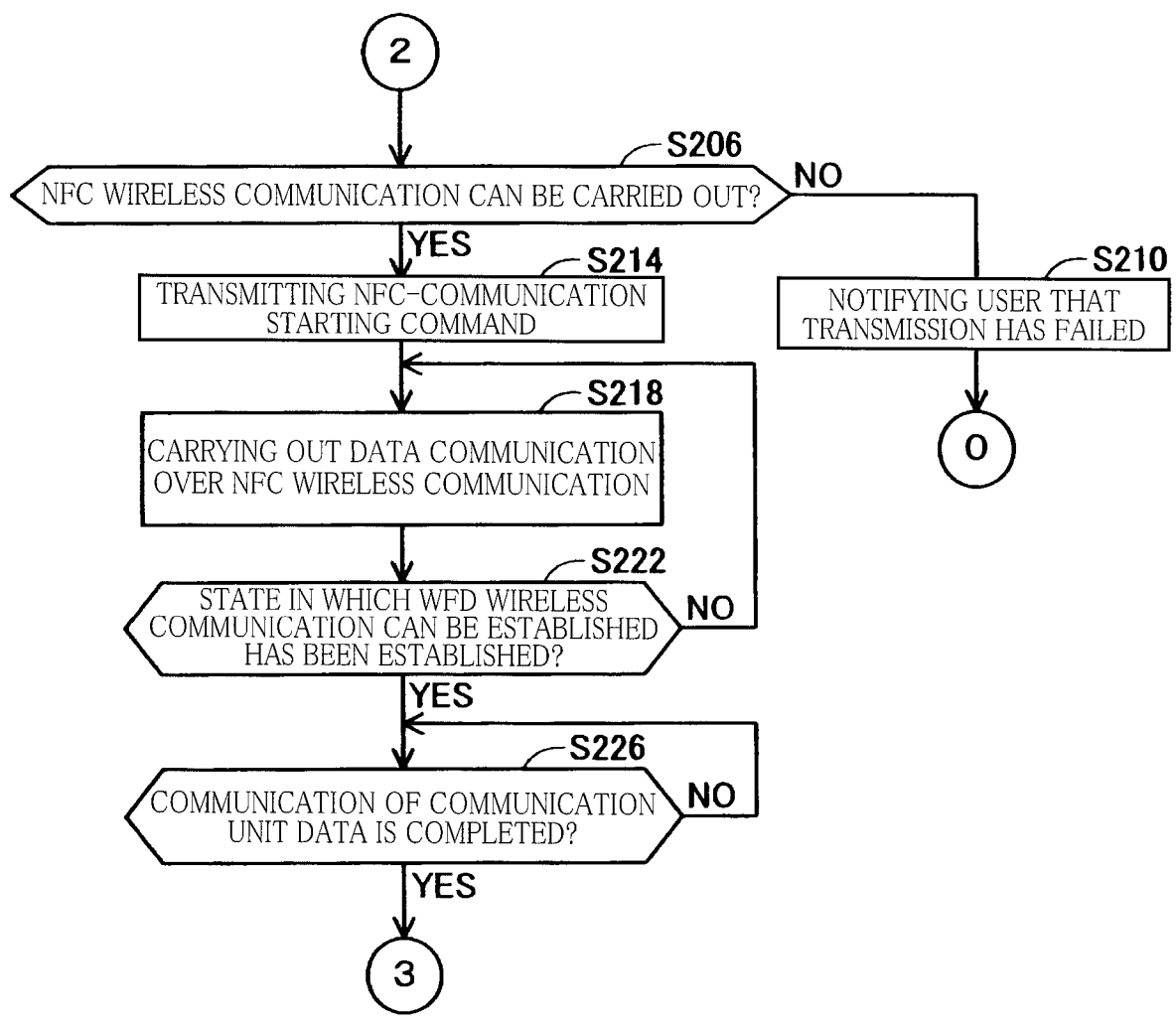
FIG. 4 is a flow chart illustrating operations of the MFP.

There will be next explained operations of the MFP 51 with reference to FIGS. 2-4. A flow illustrated in FIGS. 2-4 begins when the MFP 51 is turned on.

This flow begins with S112 at which the CPU 32 displays a waiting screen on the panel 39. The CPU 32 at S120 determines whether the communication terminal 100 has touched the MFP 51 or not. Specifically, the CPU 32 determines whether the NFC communication interface 112 of the communication terminal 100 has been brought into close proximity to the NFC communication interface 36 of the MFP 51 or not, in other words, the CPU 32 determines whether the NFC communication interface 112 of the communication terminal 100 has been placed within a predetermined distance or range around the NFC communication interface 36 or not. One example of the predetermined distance is about 10 cm. When a negative decision is made at S120 (S120: NO), the CPU 32 repeats the processing at S120. When a positive decision is made at S120 (S120: YES), this flow goes to S122.

The CPU 32 at S122 controls the NFC communication interface 36 to establish the NFC wireless communication 153. The CPU 32 at S123 transmits WFD-connection setting information to the communication terminal 100 over the NFC wireless communication 153. The WFD-connection setting information is used for establishing the WFD wireless communication 155. One example of information contained in the WFD-connection setting information is a designated SSID. The designated SSID is an SSID which is designated by the MFP 51 and whose character string changes upon each issue. A one-time SSID may be used alternatively.

The CPU 32 at S124 determines whether the MFP 51 has received a data communication request from the communication terminal 100 over the NFC wireless communication 153 or not. The data communication request is information for requesting communication of data (e.g., image data) between the communication terminal 100 and the MFP 51. The data communication request may be transmitted from the communication terminal 100 to the MFP 51 when a data transmission command is transmitted in response to a user's input and received by the communication terminal 100 in a state in which a program used for the data communication (e.g., the application 121) is running on the communication terminal 100. Also, in the case where data is transmitted from the communication terminal 100 to the MFP 51, the data communication request may contain information about an amount of data to be transmitted such as the number of bytes and the number of pages. When a positive decision is made at S124 (S124: YES), this flow goes to S140.

The CPU 32 at S140 determines whether an amount of data to be transferred is smaller than a predetermined amount or not. This determination may be made by comparing the information about the amount of data transmitted which is contained in the data communication request, with the predetermined amount. The predetermined amount may be determined in advance by the user, for example. Also, the predetermined amount needs to be determined such that a length of time of communication from the start to the end of the data communication is not longer in a case where the data communication is carried out over the WFD wireless communication 155 after the communication method or communication path is switched from the NFC wireless communication 153 to the WFD wireless communication 155 than in a case where the data communication is carried out over the NFC wireless communication 153 without a switch from the NFC wireless communication 153 to the WFD wireless communication 155. That is, when the CPU 32 executes processings at S178-S190 for switching the communication method from the NFC wireless communication 153 to the WFD wireless communication 155, a switching time in which communication cannot be carried out is generated, and the predetermined amount needs to be the minimum amount of data in which effects on the switching time cannot be ignored. The predetermined amount may be determined as an amount of data to be transferred and may be 100 KB, for example. Also, in a case where data to be transferred is image data corresponding to a plurality of pages, the predetermined amount may be determined as the number of pages and may be a value of equal to or less than two pages, for example.

When a positive decision is made at S140 (S140: YES), the amount of data to be transferred is small, and accordingly the CPU 32 determines that the data communication can be carried out using the current NFC wireless communication 153. In this case, this flow goes to S152. Processings at S152 and subsequent steps will be described later. When a negative decision is made at S140 (S140: NO), the amount of data to be transferred is large, and accordingly the CPU 32 determines that the communication path used for the data communication should be switched to the WFD wireless communication 155. Thus, this flow goes to S144.

The CPU 32 at S144 displays a WFD-connection check screen on the panel 39. The WFD-connection check screen is a screen on which the user inputs a command about whether the communication path for data communication is to be switched to the WFD wireless communication 155 or not. For example, the WFD-connection check screen may contain a character string "Do you want to switch from NFC to WFD?" and button images such as a "YES" image and a "NO" image. The CPU 32 at S148 determines whether an execution command for carrying out the WFD wireless communication 155 has been input or not. This determination may be made, for example, by determining whether the user has touched the "YES" image or the "NO" image displayed on the WFD-connection check screen. When a positive decision is made at S148 (S148: YES), this flow goes to S174. When a negative decision is made at S148 (S148: NO), this flow goes to S152.

The CPU 32 at S152 transmits an NFC-communication starting command to the communication terminal 100 over the NFC wireless communication 153. The NFC-communication starting command is information for commanding the communication terminal 100 to transfer data over the NFC wireless communication 153.

The CPU 32 at S156 uses the NFC wireless communication 153 to carry out data communication with the communication terminal 100. Data to be transferred is divided into a plurality of pieces of communication unit data. The data communication is carried out for each of the pieces of communication unit data. The pieces of communication unit data may be defined by various kinds of units. For example, in a case where the data to be transferred is image data representative of a plurality of pages, the pieces of communication unit data respectively represent the pages of the image data. Also, each of the pieces of communication unit data may be packet data, for example.

The CPU 32 at S160 determines whether the NFC wireless communication 153 has been disconnected during the data communication or not. The NFC wireless communication 153 is disconnected when the communication terminal 100 is moved away from the MFP 51 to a position which is distant from the MFP 51 by equal to or greater than the predetermined distance, for example. When a positive decision is made at S160 (S160: YES), the CPU 32 determines that the communication path needs to be switched to the WFD wireless communication 155, and this flow goes to S190. When a negative decision is made at S160 (S160: NO), this flow goes to S164.

The CPU 32 at S164 determines whether the data communication with the communication terminal 100 is finished or not. When a negative decision is made at S164 (S164: NO), this flow returns to S160. When a positive decision is made at S160 (S164: YES), this flow goes to S166. The CPU 32 at S166 executes various data processings. For example, when the data communication is a receipt of print data from the communication terminal 100, the CPU 32 at S166 executes a print processing based on print data. Upon completion of the processing at S166, this flow returns to S112.

When the CPU 32 at S124 determines that the data communication request has not been received (S124: NO), the CPU 32 determines that the program used for the data communication (e.g., the application 121) is not running on the communication terminal 100, and this flow goes to S128. The CPU 32 at S128 uses the NFC wireless communication 153 to send the communication terminal 100 an application activation command which is information for commanding the communication terminal 100 to run the program used for the data communication. The CPU 32 at S132 displays the WFD-connection check screen on the panel 39. The WFD-connection check screen is explained at S144 above, and an explanation of which is dispensed with. The CPU 32 at S136 determines whether the execution command for carrying out the WFD wireless communication 155 has been input or not. When a negative decision is made at S136 (S136: NO), this flow returns to S120. When a positive decision is made at S136 (S136: YES), this flow goes to S174.

The CPU 32 at S174 determines whether the WFD wireless communication 155 can be established at this time with the communication terminal 100 or not. For example, when the wireless LAN interface 34 can establish only one WFD wireless communication and when the WFD wireless communication 156 is being established with the communication terminal 101, the CPU 32 determines that the WFD wireless communication 155 cannot be established at this time with the communication terminal 100. When a positive decision is made at S174 (S174: YES), this flow goes to S178.

The CPU 32 at S178 transmits a WFD-communication starting command to the communication terminal 100 over the NFC wireless communication 153. The WFD-communication starting command is information for commanding the communication terminal 100 to execute data communication over the WFD wireless communication 155.

The CPU 32 at S182 determines whether WFD-connection start information has been received from the communication terminal 100 over the NFC wireless communication 153 or not. The WFD-connection start information is information for notifying the MFP 51 that a processing for establishing the WFD wireless communication 155 has been started on the communication terminal 100. When a negative decision is made at S182 (S182: NO), the CPU 32 repeats the processing at S182. When a positive decision is made at S182 (S182: YES), this flow goes to S186 at which the CPU 32 transmits a connection-start response to the communication terminal 100 over the NFC wireless communication 153. The connection-start response is information for notifying the communication terminal 100 that the MFP 51 has started the processing for establishing the WFD wireless communication 155. The CPU 32 at S190 establishes the WFD wireless communication 155.

The CPU 32 at S198 carries out data communication with the communication terminal 100 over the WFD wireless communication 155. The CPU 32 at S202 determines whether the data communication with the communication terminal 100 is finished or not. When a negative decision is made at S202 (S202: NO), this flow returns to S198. When a positive decision is made at S202 (S202: YES), this flow goes to S204. The CPU 32 at S204 executes the data processing. The details of the data processing are explained at S166 above, and an explanation of which is dispensed with. Upon completion of the processing at S204, this flow returns to S112.

When the CPU 32 at S174 determines that the WFD wireless communication 155 cannot be established at this time (S174: NO), this flow goes to S206. The CPU 32 at S206 determines whether the NFC wireless communication 153 can be carried out at this time or not. Specifically, the CPU 32 determines whether the NFC communication interface 112 of the communication terminal 100 is present within the predetermined distance from the NFC communication interface 36 of the MFP 51 or not. When a negative decision is made at S206 (S206: NO), the CPU 32 determines that there is no communication path through which the NFC wireless communication 153 can be carried out with the communication terminal 100, this flow goes to S210. The CPU 32 at S210 notifies the user about an error of the transmission. For example, the CPU 32 may control the panel 39 to display a character string "Transmission has failed". Upon completion of the processing at S210, this flow returns to S112.

When a positive decision is made at S206 (S206: YES), this flow goes to S214. The CPU 32 at S214 transmits the NFC-communication starting command to the communication terminal 100 over the NFC wireless communication 153. The details of the NFC-communication starting command are explained at S152 above, and an explanation of which is dispensed with. The CPU 32 at S218 uses the NFC wireless communication 153 to carry out data communication with the communication terminal 100. The details of the data communication are explained at S156 above, and an explanation of which is dispensed with.

The CPU 32 at S222 determines whether or not the state between the MFP 51 and the communication terminal 100 has been returned to the state in which the WFD wireless communication 155 can be established with the communication terminal 100. For example, when the WFD wireless communication 156 having been established with the communication terminal 101 is disconnected, the CPU 32 determines that the state between the MFP 51 and the communication terminal 100 has been returned to the state in which the WFD wireless communication 155 can be established with the communication terminal 100. When a negative decision is made at S222 (S222: NO), this flow returns to S218. When a positive decision is made at S222 (S222: YES), this flow goes to S226.

The CPU 32 at S226 determines whether communication of a certain piece of communication unit data which is being transferred in the data communication over the NFC wireless communication 153 is completed or not. For example, the CPU 32 may determine whether or not communication of the certain piece of communication unit data is completed which is most recently transferred in the data communication over the NFC wireless communication 153. Specifically, the CPU 32 may determine whether or not communication of a certain piece of communication unit data is completed which is being transferred at the time when the state in which the WFD wireless communication 155 can be established is established at S222. The certain piece of communication unit data is one of a plurality of pieces of communication unit data. When a negative decision is made at S226 (S226: NO), the CPU 32 repeats the processing at S226.

When a positive decision is made at S226 (S226: YES), the CPU 32 determines that the communication path should be switched to the WFD wireless communication at this timing, and this flow goes to S178. The MFP 51 at S178 transmits the WFD-communication starting command, at S186 transmits the connection-start response, and at S190 establishes the WFD wireless communication 155. The CPU 32 at S198 uses the WFD wireless communication 155 to transmit the next piece of communication unit data after the piece of communication unit data whose transfer is determined to be completed at S226.

<Operations of Communication Terminal 100>

Figure 5:
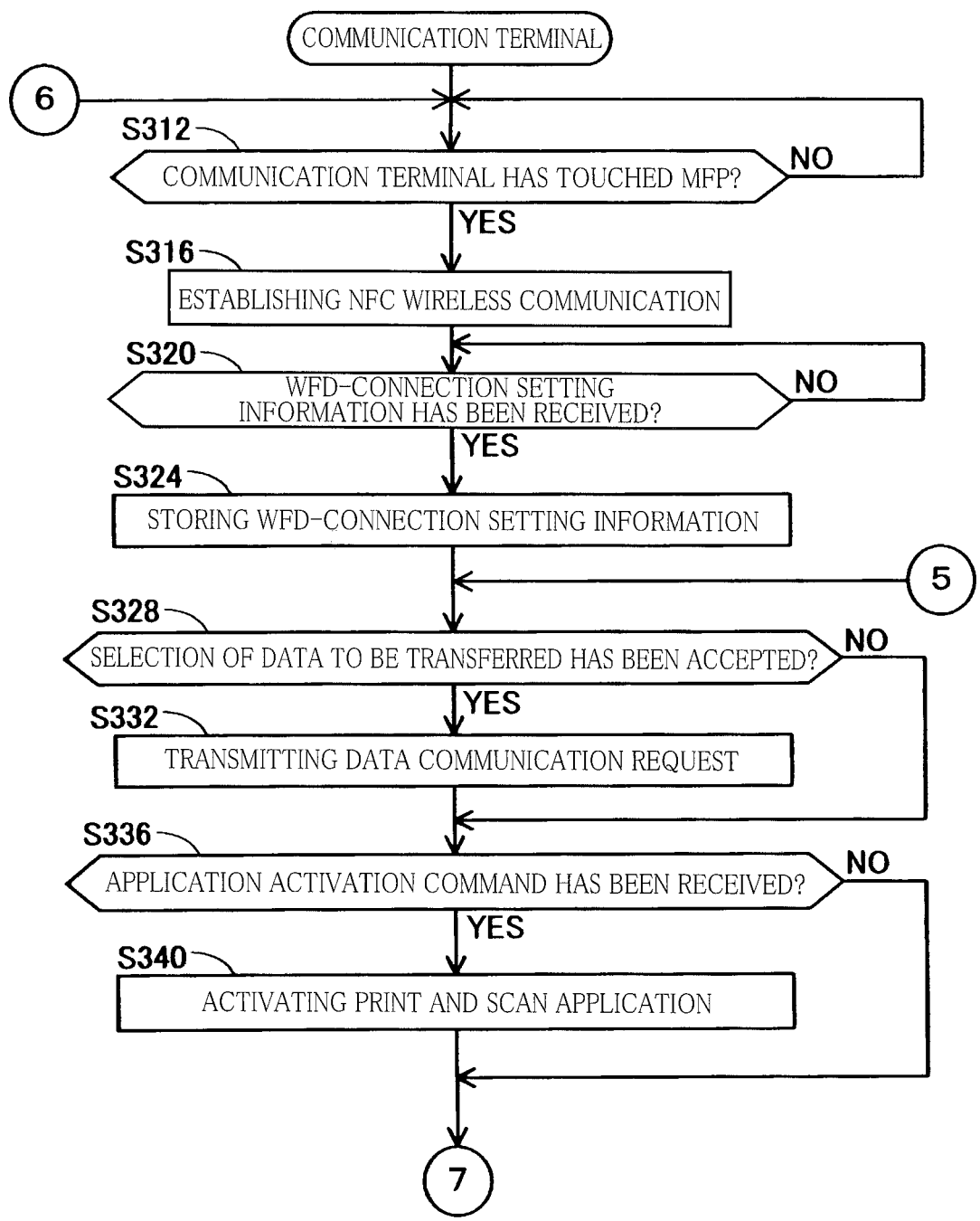
FIG. 5 is a flow chart illustrating operations of a communication terminal.

There will be next explained operations of the communication terminal 100 with reference to FIGS. 5 and 6. A flow illustrated in FIGS. 5 and 6 begins when the communication terminal 100 is turned on.

This flow begins with S312 at which the CPU 106 determines whether the communication terminal 100 has touched the MFP 51 or not. Specifically, the CPU 106 determines whether the NFC communication interface 36 of the MFP 51 is located within a predetermined distance or range around the NFC communication interface 112 of the communication terminal 100 or not. When a negative decision is made at S312 (S312: NO), the CPU 106 repeats the processing at S312. When a positive decision is made at S312 (S312: YES), this flow goes to S316. The CPU 106 at S316 controls the NFC communication interface 112 to establish the NFC wireless communication 153.

The CPU 106 at S320 determines whether the WFD-connection setting information has been received from the MFP 51 over the NFC wireless communication 153 or not. When a negative decision is made at S320 (S320: NO), the CPU 106 repeats the processing at S320. When a positive decision is made at S320 (S320: YES), this flow goes to S324. The CPU 106 at S324 stores the received WFD-connection setting information into the storage device 109.

The CPU 106 at S328 determines whether an operation for selecting data to be transferred has been accepted or not. For example, in a case where print data is to be transmitted to the MFP 51, the CPU 106 determines whether or not an operation for selecting data to be printed has been accepted by the touch panel 103 in the state in which the application 121 is running. When a negative decision is made at S328 (S328: NO), this flow goes to S336. When a positive decision is made at S328 (S328: YES), this flow goes to S332. The CPU 106 at S332 transmits the data communication request to the MFP 51 over the NFC wireless communication 153, and this flow goes to S336.

The CPU 106 at S336 determines whether the application activation command has been received from the MFP 51 over the NFC wireless communication 153 or not. When a negative decision is made at S336 (S336: NO), this flow goes to S344. When a positive decision is made at S336 (S336: YES), this flow goes to S340. The CPU 106 at S340 activates the application 121, and this flow goes to S344.

The CPU 106 at S344 determines whether the NFC-communication starting command has been received from the MFP 51 over the NFC wireless communication 153 or not. When a positive decision is made at S344 (S344: YES), this flow goes to S348. The CPU 106 at S348 uses the NFC wireless communication 153 to carry out data communication with the MFP 51.

The CPU 106 at S352 determines whether the NFC wireless communication 153 has been disconnected during the data communication or not. When a positive decision is made at S352 (S352: YES), the CPU 106 determines that the communication path needs to be switched to the WFD wireless communication 155, and this flow goes to S372. When a negative decision is made at S352 (S352: NO), this flow goes to S354. The CPU 106 at S354 determines whether the WFD-communication starting command has been received from the MFP 51 over the NFC wireless communication 153 or not. When a positive decision is made at S354 (S354: YES), this flow goes to S364. When a negative decision is made at S354 (S354: NO), this flow goes to S356.

The CPU 106 at S356 determines whether the data communication with the MFP 51 is finished or not. When a negative decision is made at S356 (S356: NO), this flow returns to S352. When a positive decision is made at S356 (S356: YES), this flow returns to S312.

When the CPU 106 at S344 determines that the NFC-communication starting command has not received (S344: NO), this flow goes to S360. The CPU 106 at S360 determines whether the WFD-communication starting command has been received from the MFP 51 over the NFC wireless communication 153 or not. When a negative decision is made at S360 (S360: NO), this flow returns to S328. When a positive decision is made at S360 (S360: YES), this flow goes to S364.

The CPU 106 at S364 transmits the WFD-connection start information to the MFP 51 over the NFC wireless communication 153. The CPU 106 at S368 determines whether the connection-start response has been received from the MFP 51 over the NFC wireless communication 153 or not. When a negative decision is made at S368 (S368: NO), the CPU 106 repeats the processing at S368. When a positive decision is made at S368 (S368: YES), this flow goes to S372.

The CPU 106 at S372 establishes the WFD wireless communication 155. The WFD wireless communication 155 is established based on the WFD-connection setting information stored at S324.

The CPU 106 at S376 uses the WFD wireless communication 155 to carry out data communication with the MFP 51. The CPU 106 at S380 determines whether the data communication with the MFP 51 is finished or not. When a negative decision is made at S380 (S380: NO), this flow returns to S376. When a positive decision is made at S380 (S380: YES), this flow returns to S312.

<First Specific Example of Operations>

There will be next explained, as a first specific example, operations in a case where the WFD wireless communication 155 is established in a period in which the NFC wireless communication 153 is carried out because the WFD wireless communication 155 cannot be established. There will be explained, by way of example, a case where print data is transmitted from the communication terminal 100 to the MFP 51. In this example, the print data is data corresponding to three pages, and a data amount of the print data is greater than a predetermined amount.

When the user has brought the communication terminal 100 into contact with the MFP 51 after selecting print data to be transmitted by operating the communication terminal 100, the contact or touch is detected (S120: YES, S312: YES). As a result, the NFC wireless communication 153 is started (S122, S316), and the WFD-connection setting information is transmitted from the MFP 51 to the communication terminal 100 (S123, S320: YES). Since the communication terminal 100 has already accepted the selection of the print data to be transmitted (S328: YES), the data communication request is transmitted from the communication terminal 100 to the MFP 51 (S332, S124: YES).

Since the data amount of the print data is larger than the predetermined amount (S140: NO), the MFP 51 displays the WFD-connection check screen on the panel 39 (S144). Here, it is assumed that the user inputs the execution command for carrying out the WFD wireless communication 155 (S148: YES), that the MFP 51 cannot establish the WFD wireless communication 155 with the communication terminal 100 because the MFP 51 is carrying out the WFD wireless communication 156 with the communication terminal 101, and that the NFC wireless communication 153 can be carried out at this time (S206: YES).

A piece of the print data representative of the first page is transmitted from the communication terminal 100 to the MFP 51 over the NFC wireless communication 153 (S218, S348). Here, it is assumed that the state between the MFP 51 and the communication terminal 100 has been changed, during the transmission of the piece of the print data representative of the first page, to the state in which the WFD wireless communication 155 can be established with the communication terminal 100 (S222: YES). When having received the piece of the print data representative of the first page over the NFC wireless communication 153 (S226: YES), the MFP 51 transmits the WFD-communication starting command to the communication terminal 100 (S178). When having received the WFD-communication starting command (S354: YES), the communication terminal 100 establishes the WFD wireless communication 155 (S190, S372). A piece of the print data representative of the second page starts to be transmitted from the communication terminal 100 to the MFP 51 over the WFD wireless communication 155 (S198, S376).

Upon completion of the transmission of the print data (S202: YES, S380: YES), the MFP 51 executes the print processing to control the printer 19 to perform printing based on the received print data (S204).

<Second Specific Example of Operations>

There will be next explained, as a second specific example, operations in a case where the NFC wireless communication 153 is disconnected in a period in which data communication carried out over the NFC wireless communication 153. There will be explained, by way of example, a case where print data is transmitted from the communication terminal 100 to the MFP 51. In this example, a data amount of the print data is less than the predetermined amount.

The processings S112-S140 in this example are similar to those in the first specific example, and an explanation thereof is dispensed with. Since the data amount of the print data is smaller than the predetermined amount (S140: YES), the MFP 51 transmits the NFC-communication starting command (S152). When having received the NFC-communication starting command (S344: YES), the communication terminal 100 uses the NFC wireless communication 153 to transmit the print data to the MFP 51 (S348, S156).

Here, there will be explained a case where the NFC wireless communication 153 is disconnected during a transfer of the print data (S160: YES, S352: YES). In this case, the WFD wireless communication 155 is established (S190, S372), and the transfer of the print data is started again over the WFD wireless communication 155 (S198, S376). Operations after this operation are similar to those in the first specific example, and an explanation thereof is omitted.

<Effects>

The communication speed in the WFD wireless communication is faster than that in the NFC wireless communication. This causes a case where data communication is executed after the communication method is switched from the NFC communication to the WFD communication. When the CPU 32 executes the processings (S178-S190) for switching the communication method, however, the switching time in which data communication cannot be carried out is generated. The switching time may cause a situation in which a length of time from the start to the end of data communication is longer in a case where data communication is carried out over the WFD wireless communication 155 with a switch of the communication method than in a case where the data communication is carried out over the NFC wireless communication 153 without any switch of the communication method. When starting data communication with the communication terminal 100, the MFP 51 described above can select appropriate communication between data communication using the NFC wireless communication 153 without any switch and data communication using the WFD wireless communication 155 with a switch, making it possible to prevent a long communication time.

In the MFP 51 described above, when the NFC wireless communication 153 is disconnected in a period in which data communication is carried out with the communication terminal 100 over the NFC wireless communication 153 (S160: YES), the communication path is automatically switched to the WFD wireless communication 155, allowing the data communication to be continued (S190, S198). As a result, the communication path can be made redundant, making it possible to prevent an occurrence of a situation in which the data communication cannot be carried out.

When the WFD wireless communication 155 cannot be carried out (S174: NO), the MFP 51 described above can wait for reestablishment of the WFD wireless communication 155 while carrying out the NFC wireless communication 153 (S218). When the WFD wireless communication 155 can be established (S222: YES), the communication path can be switched to the WFD wireless communication 155. As a result, a period for waiting for the establishment of the WFD wireless communication 155 can be used for a period of communication using the NFC wireless communication 153, thereby shortening the communication time. When the communication path is switched to the WFD wireless communication 155 in the period in which the data communication is being carried out over the NFC wireless communication 153, a switch of the communication can be carried out at a boundary between a piece of communication unit data being transferred and the next piece of communication unit data (S226: YES, S190). This processing can prevent a transmission error in the piece of communication unit data which is being transmitted at the time of the switch of the communication path.

In the MFP 51 described above, the user can bring the communication terminal 100 on which the application 121 is not running, into contact with the MFP 51 to activate the application 121 on the communication terminal 100 (S128, S340). That is, the intuitive operation allows the user to activate the application 121 required for controlling the MFP 51. This improves usability for the user.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

Modifications

When the NFC wireless communication 153 is established (S122), the CPU 32 may control the panel 39 to display a communication-path-selection accepting screen on which the user selects a communication path to be used for data communication with the communication terminal 100, between the NFC wireless communication 153 and the WFD wireless communication 155. Examples of images displayed on the communication-path-selection accepting screen include a character string "Select communication path" and button images such as an "NFC communication" image and a "WFD communication" image. The MFP 51 may be configured such that when the NFC wireless communication 153 is selected, the flow goes to S152, and when the WFD wireless communication 155 is selected, the flow goes to S174. Thus, the communication path to be used for the data communication can be determined by operation of the user. The communication-path-selection accepting screen is one example of an accepting screen. A processing for displaying the communication-path-selection accepting screen on the panel 39 is one example of an accepting processing.

The CPU 32 may omit the processing at S128 such that the flow goes from S124 to S132. This modification can omit the processing for causing the communication terminal 100 to activate the application 121. The CPU 32 may omit the processings at S144, S148, and when a negative decision is made at S140 (S140: NO), the flow may go to S174. In this modification, when the CPU 32 determines that the communication path is preferably switched to the WFD wireless communication 155, the CPU 32 can start the processing for switching the communication path to the WFD wireless communication 155 without a need of operation of the user. The CPU 32 may omit the processings at S182, S186, and the flow may go from S178 to S190. This modification can shorten a length of time extending from the transmission of the WFD-communication starting command to the establishment of the WFD wireless communication 155. In view of the above, the CPU 32 of the MFP 51 only needs to execute at least a first communication processing, a first-information obtaining processing, a second communication processing, and a third communication processing. For example, the CPU 32 only needs to at least execute at least the processing at S122, one of S140 and S148, S156, and S198.

The data communication is not limited to the transmission of the print data from the communication terminal 100 to the MFP 51 and includes various kinds of data communication. For example, the data communication includes a transmission of scan data from the MFP 51 to the communication terminal 100. In this case, the MFP 51 may at S124 receive a data communication request for requesting a transmission of scan data to the communication terminal 100. The MFP 51 may control the scanner 20 to scan a document to create scan data. The CPU 32 may at S140 determine whether data amount of the created scan data is less than the predetermined amount or not.

Communication standards other than the NFC may be used for communication started when the communication terminal 100 is brought into contact with the MFP 51. For example, standards such as TransferJet™ may be used. The communication path after the switch is not limited to the WFD wireless communication 155 and may be a communication path in the infrastructure mode via the wireless LAN communication 151, 154.

The communication terminal 100 may be configured such that an external memory such as a memory card can be connected to the communication terminal 100, and various kinds of data may be stored in the external memory instead of the storage device 109.

The NFC standard is one example of a first communication standard. The NFC wireless communication 153 is one example of first wireless communication. Each of the NFC communication interfaces 36, 112 is one example of a first communication interface. The WFD standard is one example of a second communication standard. The WFD wireless communication 155 is one example of second wireless communication. Each of the wireless LAN interfaces 34, 105 is one example of a second communication interface. Each of the CPUs 32, 106 is one example of a processor. The MFP 51 is one example of an information processing apparatus. The processing at S122 is one example of the first communication processing. The data communication request or the execution command for carrying out the WFD wireless communication 155 is one example of first information. The processing at S140 or S148 is one example of the first-information obtaining processing. The processing at S140 or S148 is one example of a determination processing. The processing at S156 is one example of the second communication processing. The WFD-connection setting information is one example of first setting information. The processing at S198 is one example of the third communication processing. The processing at S198 is one example of a fourth communication processing. The processing at S156 is one example of a fifth communication processing. The application 121 is one example of a communication program. The processing at S124 is one example of a second-information obtaining processing. The processing at S128 is one example of an output processing. The NFC-communication starting command is one example of first command information. The processing at S344 is one example of a first-command-information obtaining processing. The processing at S348 is one example of a second communication processing. The WFD-communication starting command is one example of second command information. The processing at S360 is one example of a second-command-information obtaining processing. The processing at S376 is one example of a third communication processing. The processing at S376 is one example of a fourth communication processing.

What is claimed is:

1. An information processing apparatus, comprising:
a first communication interface configured to carry out first wireless communication with a communication terminal according to a first communication standard;
a second communication interface configured to carry out second wireless communication with the communication terminal according to a second communication standard;
a processor; and
a memory configured to store a plurality of instructions, the plurality of instructions, when executed by the processor, causing the information processing apparatus to:
transmit connection setting information and an activation command for commanding the communication terminal to activate an application program to the communication terminal over the first wireless communication, the connection setting information being used for establishing the second wireless communication; and
after transmitting the activation command to the communication terminal, establish the second wireless communication, with the communication terminal, in which the connection setting information transmitted from the information processing apparatus is used by the communication terminal, and carry out data communication with the communication terminal.

2. The information processing apparatus according to claim 1,
wherein, when executed by the processor, the plurality of instructions cause the information processing apparatus to transmit data to the communication terminal in the data communication.

3. The information processing apparatus according to claim 2,
wherein the transmitted data in the data communication is image data created by the information processing apparatus.

4. The information processing apparatus according to claim 1,
wherein, when executed by the processor, the plurality of instructions cause the information processing apparatus to execute a data processing of processing data transmitted from the communication terminal.

5. The information processing apparatus according to claim 1,
wherein the connection setting information includes an SSID (Service Set Identifier).

6. The information processing apparatus according to claim 5,
wherein a character string of the SSID is changed upon each issue.

7. The information processing apparatus according to claim 5,
wherein the SSID is an SSID which is designated by the information processing apparatus.

8. The information processing apparatus according to claim 1,
wherein the first communication interface is an NFC (Near Field Communication) interface, and
wherein the second communication interface is a wireless LAN interface.

9. The information processing apparatus according to claim 1,
wherein, when an execution command for carrying out the second wireless communication is input on a connection check screen, the second wireless communication with the communication terminal is established by using the connection setting information.

10. A non-transitory storage medium storing a plurality of instructions executable by a processor of an information processing apparatus, the information processing apparatus comprising a first communication interface configured to carry out first wireless communication with a communication terminal according to a first communication standard, a second communication interface configured to carry out second wireless communication with the communication terminal according to a second communication standard, the processor, a memory configured to store the plurality of instructions, wherein the plurality of instructions, when executed by the processor, cause the information processing apparatus to:

transmit connection setting information and an activation command for commanding the communication terminal to activate an application program to the communication terminal over the first wireless communication, the connection setting information being used for establishing the second wireless communication; and after transmitting the activation command to the communication terminal, establish the second wireless communication, with the communication terminal, in which the connection setting information transmitted from the information processing apparatus is used by the communication terminal, and carry out data communication with the communication terminal.

11. The non-transitory storage medium according to claim 10,
    wherein, when executed by the processor, the plurality of instructions cause the information processing apparatus to transmit data to the communication terminal in the data communication.

12. The non-transitory storage medium according to claim 11,
    wherein the transmitted data in the data communication is image data created by the information processing apparatus.

13. The non-transitory storage medium according to claim 10,
    wherein, when executed by the processor, the plurality of instructions cause the information processing apparatus to execute a data processing of processing data transmitted from the communication terminal.

14. The non-transitory storage medium according to claim 10,
    wherein the connection setting information includes an SSID (Service Set Identifier).

15. The non-transitory storage medium according to claim 14,
    wherein a character string of the SSID is changed upon each issue.

16. The non-transitory storage medium according to claim 14,
    wherein the SSID is an SSID which is designated by the information processing apparatus.

17. The non-transitory storage medium according to claim 10,
    wherein the first communication interface is an NFC (Near Field Communication) interface, and
    wherein the second communication interface is a wireless LAN interface.

18. The non-transitory storage medium according to claim 10,
    wherein, when an execution command for carrying out the second wireless communication is input on a connection check screen, the second wireless communication with the communication terminal is established by using the connection setting information.

19. A method of information processing by an information processing apparatus, the information processing apparatus comprising a first communication interface configured to carry out first wireless communication with a communication terminal according to a first communication standard, a second communication interface configured to carry out second wireless communication with the communication terminal according to a second communication standard, the method comprising:

transmitting connection setting information and an activation command for commanding the communication terminal to activate an application program to the communication terminal over the first wireless communication, the connection setting information being used for establishing the second wireless communication; and after transmitting the activation command to the communication terminal, establishing the second wireless communication, with the communication terminal, in which the connection setting information transmitted from the information processing apparatus is used by the communication terminal, and carrying out data communication with the communication terminal.

20. The method according to claim 19,
    wherein, when an execution command for carrying out the second wireless communication is input on a connection check screen, the second wireless communication with the communication terminal is established by using the connection setting information.

\* \* \* \* \*